(12) United States Patent
Chartrel et al.

(10) Patent No.: US 11,885,505 B2
(45) Date of Patent: Jan. 30, 2024

(54) FILTER DEVICE AND FUME EXTRACTION DEVICE COMPRISING FILTER DEVICE

(71) Applicant: BSH Hausgeräte GmbH, Munich (DE)

(72) Inventors: Aurélien Chartrel, Lingolsheim (FR); Henri Klein, Riedisheim (FR); Florent Lagorgette, Dossenheim (FR); Guillaume Laurent, Bischoffsheim (FR)

(73) Assignee: BSH Hausgeräte GmbH, Munich (DE)

( * ) Notice: Subject to any disclaimer, the term of this patent is extended or adjusted under 35 U.S.C. 154(b) by 672 days.

(21) Appl. No.: 17/045,770

(22) PCT Filed: Apr. 8, 2019

(86) PCT No.: PCT/EP2019/000114
§ 371 (c)(1),
(2) Date: Oct. 7, 2020

(87) PCT Pub. No.: WO2019/197055
PCT Pub. Date: Oct. 17, 2019

(65) Prior Publication Data
US 2021/0055002 A1    Feb. 25, 2021

(30) Foreign Application Priority Data
Apr. 10, 2018 (EP) .................................. 18290031

(51) Int. Cl.
*F24C 15/20* (2006.01)
*B01D 46/56* (2022.01)

(52) U.S. Cl.
CPC .......... *F24C 15/2035* (2013.01); *B01D 46/56* (2022.01); *F24C 15/2042* (2013.01); *B01D 2275/206* (2013.01)

(58) Field of Classification Search
CPC .... B01D 46/121; B01D 46/56; F24C 15/2035
(Continued)

(56) References Cited

U.S. PATENT DOCUMENTS 6,162,286 A    12/2000 Hasama
6,455,818 B1    9/2002 Arntz et al.
(Continued)

FOREIGN PATENT DOCUMENTS

CN    101986041 A    3/2011
CN    102656409 A    9/2012
(Continued)

OTHER PUBLICATIONS

National Search Report CN 201980024518 dated May 22, 2022.
(Continued)

*Primary Examiner* — Vivek K Shirsat
(74) *Attorney, Agent, or Firm* — Michael E. Tschupp; Andre Pallapies; Brandon G. Braun

(57) ABSTRACT

A filter device for a fume extraction device includes at least two filter elements arranged at an angle relative to one another, and a holding frame for holding the at least two filter elements. An edge of one of the at least two filter elements lies adjacent to an edge of the other one of the at least two filter element. Each of the at least two filter elements has a surface with a variable distance between opposite outer faces of the filter element.

23 Claims, 4 Drawing Sheets

(58) Field of Classification Search
USPC .................... 454/158, 56, 67; 126/299 D
See application file for complete search history.

(56) References Cited

U.S. PATENT DOCUMENTS

| | | | |
|---|---|---|---|
| 7,775,865 B2 * | 8/2010 | Livchak | F24C 15/2021 454/67 |
| 2003/0101986 A1 | 6/2003 | Maier | |
| 2005/0211415 A1 | 9/2005 | Arts | |
| 2012/0055127 A1 * | 3/2012 | Holzmann | B01D 46/10 55/497 |
| 2019/0168154 A1 * | 6/2019 | Knight | B01D 46/0005 |

FOREIGN PATENT DOCUMENTS

| | | |
|---|---|---|
| DE | 10127679 A1 | 1/2003 |
| DE | 102013212921 A1 | 1/2015 |
| DE | 102018215480 A1 | 4/2019 |
| EP | 2397775 A2 | 12/2011 |
| EP | 3287701 A1 | 2/2018 |
| EP | 3614053 A1 | 2/2020 |
| EP | 2554915 B1 | 4/2020 |
| WO | 2017080781 A1 | 5/2017 |
| WO | 2018036799 A1 | 3/2018 |

OTHER PUBLICATIONS

National Search Report EP 19 725 641.5 dated Oct. 24, 2022.
International Search Report PCT/EP2019/000114 dated Jan. 18, 2019.

* cited by examiner

FILTER DEVICE AND FUME EXTRACTION DEVICE COMPRISING FILTER DEVICE

CROSS-REFERENCES TO RELATED APPLICATIONS

This application is the U.S. National Stage of International Application No. PCT/EP2019/000114, filed Apr. 8, 2019, which designated the United States and has been published as International Publication No. WO 2019/197055 A1 and which claims the priority of European Patent Application, Serial No. 18290031.6, filed Apr. 10, 2018, pursuant to 35 U.S.C. 119(a)-(d).

BACKGROUND OF THE INVENTION

The present invention relates to a filter device for a fume extraction device and to a fume extraction device with such a filter device.

In the case of fume extraction devices, which are used in particular in kitchens, it is known to use filter devices by means of which grease and other contaminants are filtered out of the fumes and vapors sucked into the fume extraction device. The filter devices represent, for example, so-called filter cartridges, which consist of multiple filter layers arranged one above the other in parallel, in particular expanded metal filter layers, which are held in a frame. Such a filter cartridge is described, for example, in DE 10 2013 212 921 A1.

In the case of fume extraction hoods, which are usually mounted on a room wall or ceiling and where the contaminated air is hence sucked up into the fume extraction device, the filter cartridge is built into the suction opening such that it covers the area of the suction opening. Multiple filter cartridges can also be inserted next to one another in the suction opening. To offer an adequate filter area that enables reliable cleaning of air, a large suction opening is therefore necessary for fume extraction hoods. With a large suction opening, however, the fume extraction hood must be operated at high power in order to ensure a reliable intake of air.

In the case of fume extraction devices which are installed in or next to a hob and which thus suck the contaminated air down into the fume extraction device, the area available for the suction opening is however small. With this type of fume extraction device too, which can also be referred to as a downdraft fan or downdraft extractor, the use of plate-shaped filter elements is likewise known. For example, DE 20 2009 008 286 U1 describes a device for extracting cooking fumes in a direction pointing below a hob level with a cooking fume intake device. According to one embodiment, in this device a plate-shaped filter element is introduced horizontally in a duct-like insert and the duct-like insert is suspended from a mounting opening. Thus in this embodiment the available filter area is limited to the size of the suction opening and is therefore small. According to an alternative embodiment a plate-shaped filter element is introduced obliquely into an enlargement of an exhaust air duct. The filter element is here placed on a holder-like projection of a part of the exhaust air duct, in particular a collecting channel formed in the exhaust air duct. Although this embodiment offers a larger filter area, it is unfavorable in terms of handling. In this embodiment the user has to reach into the exhaust air duct through the smaller suction opening in order to get to the filter element located in the enlargement located below this, for example if said filter element is to be removed for cleaning purposes.

BRIEF SUMMARY OF THE INVENTION

The object of the present invention is therefore to create a solution with which, with a simple structure of the filter device and the fume extraction device, a reliable intake and cleaning of air is possible at the same time as a low power output of the fume extraction device.

According to a first aspect the object is achieved by a filter device for a fume extraction device which comprises at least two filter elements and at least one holding frame for holding the at least two filter elements. The filter device is characterized in that each filter element has a variable distance between the opposite outer faces of the filter element over the surface of the filter element and that at least two filter elements are arranged at an angle relative to one another, and an edge of one of the filter elements lies adjacent to an edge of the other filter element.

The filter device has at least two filter elements and at least one holding frame. A filter device for a fume extraction device is understood, according to the invention, as a structural unit which can be introduced on or into a suction opening of the fume extraction device and by means of which the air can be freed of contaminants. For this purpose, the filter device has at least two filter elements. The filter elements preferably represent elongated elements. The filter element can have filter material which is held in a filter frame. Alternatively, the filter element consists of filter material and does not have its own filter frame. The filter material can, for example, be expanded metal layers, a fleece, a knitted fabric or a warp-knitted fabric. In particular, the filter material can consist of wire. In addition to the at least two filter elements, the inventive filter unit has a holding frame. The holding frame is used to hold the filter elements in the filter device.

According to the invention, each filter element has a variable distance between the opposite outer faces of the filter element over the surface of the filter element. The outer faces of the filter element can also be referred to as outer walls. The outer faces, between which the distance varies, are in particular the upper face and the lower face of the filter body. When the filter device is introduced into a fume extraction device, the upper face preferably forms the inflow side of the filter element and the lower face the outflow side, which is also referred to as the clean air side. According to the invention, the distance between the outer faces preferably varies over the width of the filter element. The width is understood here as the distance between the longitudinal edges of the filter element. The distance between end faces of the filter element is understood as the length. The dimension between the outer faces of the filter element, in particular between the upper face and lower face of the filter element, is referred to as the height or thickness of the filter element. The height can vary over the width and/or the length of the filter element. Particularly preferably, however, the height of the filter element varies only in the width direction and has a constant cross-section over the length. Particularly preferably, the height of the filter element, i.e. the distance between the opposite outer faces, is greater in the central area of the width of the filter body than in the lateral edge areas of the width.

At least two filter elements are provided in the filter device. If more than two filter elements are provided, their number is preferably a multiple of two. If multiple filter elements are provided, they are preferably arranged such that at least two filter elements each abut one another on their end faces. The filter elements are therefore preferably arranged adjacent to one another in their length direction. For a better understanding, the preferred embodiment of the filter device with only two filter elements is mainly discussed below.

According to the invention, at least two filter elements are arranged at an angle relative to one another. Here, one edge of one of the filter elements lies adjacent to one edge of the other filter element. This arrangement of the two filter elements can also be referred to as a V-shaped arrangement.

Because the filter elements firstly have a cross-section which changes over the width and/or length of the filter element and the filter elements are moreover present in a V-shaped arrangement in the filter device, a number of advantages can be achieved.

Firstly, thanks to the shape of the filter elements, in particular thanks to the variable height of the filter elements at least over the width, a targeted setting of the air permeability of the filter elements takes place with respect to an air flow which strikes an outer face of the filter element and exits again on the opposite outer face of the filter element. A constant flow resistance can here be set over the width of the filter element or the flow resistance can be varied over the width, for example be set lower in the center than at the lateral edge areas. Moreover, thanks to this three-dimensional configuration of the filter element, an optimal pressure drop can be achieved at the filter device, which is so low that a sufficient flow rate of air through the filter element can be ensured and which is nevertheless large enough that a sufficient separation of contaminants at the filter element can be ensured. Thanks to the three-dimensional configuration of the filter element the volume in which contaminants can be stored in the filter element can moreover be maximized. Besides the storage volume in the filter element, the three-dimensional configuration of the filter elements also increases the filter area. The filter area is understood here to mean the area onto which contaminated air can flow during operation of the fume extraction device. Furthermore, the geometry of the filter element can also be adapted to the shape of the filter device, in that for example the distance between the outer faces of the filter element is small, at least at the longitudinal edges of the filter element. As a result, the size of a holding element at these longitudinal edges is small and the blockage of the air flowing through the filter device is small, as a result of which the demands on the performance of the fan of the fume extraction device in which the filter device is used are reduced. Because the at least two filter elements are held in one common holding frame, the filter device can easily be removed from the fume extraction device. It is not necessary to remove the filter elements from the fume extraction device separately. Thanks to the inventive arrangement of the filter elements in a V-shape in the holding frame the filter area is further enlarged, in addition to the enlargement of the filter area by the three-dimensional configuration of the filter elements, without the size of the suction opening of the fume extraction device having to be increased. Compared to a single filter element which is introduced obliquely and nevertheless has the same filter area as the inventive filter elements which are arranged at an angle relative to one another, the V-shaped arrangement also reduces the space requirement needed in the height direction of the fume extraction device.

Thus with a simple structure of the filter device, a reliable intake and cleaning of air is enabled with, at the same time, a low power output of the fume extraction device. Moreover, the handling of the fume extraction device is simplified.

According to one embodiment, the edges of the two filter elements, which lie adjacent to one another, abut one another. The edges can in this case abut one another directly or can abut opposite sides of a web with a small thickness. In this embodiment, the size of the part of the holding frame on which these edges are held is thus small. The blockage of the air flow which flows through the filter device is thus also low. Moreover, this also further minimizes the required overall height of the filter device for a given size of the suction opening and the required size of the filter area. If the edges were to be spaced apart from one another, for example spaced apart from one another by a plate, the angle between the filter elements would have to be chosen to be smaller in order to be able to achieve the required filter area and nevertheless be able to introduce the filter device into the suction opening.

According to a preferred embodiment, the two filter elements are at an angle of less than 90° and preferably less than 40° to one another. The angle here is preferably between the center lines which extend in the width direction of the filter elements from one longitudinal edge to the opposite longitudinal edge. Due to the variable distance between the outer faces of the filter element, the angle between the facing outer faces of the two filter elements can be smaller or larger than the angle between the center lines of the filter elements. Thanks to the small angle between the center lines of the filter elements the filter area can be maximized for a given size of the suction opening.

According to a preferred embodiment, the distance between the outer faces of a filter element from one edge of the filter element in the direction of the opposite edge increases from a minimum to a maximum and to the other edge decreases from the maximum to the minimum. The edges between which the distance increases from a minimum to a maximum and decreases again to the minimum are preferably the longitudinal edges of the filter element. The change in thickness is thus preferably located in the width direction of the filter element. Preferably, the maximum of the thickness lies in the center of the width direction. The filter element can hence have an oval cross-section, for example. Because the thickness of the filter element is preferably small at the edges, the filter element can easily be held at these edges in the holding frame of the filter device. In particular, only a part of the holding frame with a small size is required to hold the thin edges. This further reduces the blockage of the air. However, since there is a greater thickness over the width of the filter element, the storage volume of the filter element is still large.

According to a preferred embodiment, the filter element has a diamond-shaped cross-section. In addition to the advantages mentioned of the thickness of the filter element increasing to a maximum, this embodiment has the particular advantage that the filter element can easily be produced and can be reliably held at the longitudinal edges in the holding frame by simple means, for example rails.

According to one embodiment, the holding frame has two end walls which abut end faces of the at least two filter elements, and rails of the holding frame run between the end walls. Parts of the holding frame which have an elongated channel shape are referred to here as rails. The rails hence each serve to accommodate an edge, in particular a longitudinal edge of the filter elements. The end walls and rails are preferably made of plastic or metal. The end walls delimit the space which is formed between the filter elements arranged at an angle relative to one another, at the longitudinal ends of the filter elements. The end walls hence preferably form a triangular surface or a trapezoidal surface.

The filter elements can be fastened to the end walls. However, it is also within the scope of the invention for the filter elements only to be fastened to the rails, for example to be accommodated in the rails, and for the rails to be fastened to the end walls. In addition to the rails, struts can be provided between the end walls, which extend perpendicular to the rails and connect them to one another. Because the holding frame is formed at least by end walls and rails, it has stability. The filter elements which are held in this holding frame can therefore be of simple construction. For example, the filter elements can consist exclusively of filter material and in particular not have a separate filter frame. For example, the filter elements can be formed from filter layers which are held together at the edges by the rails of the holding frame.

According to a preferred embodiment, a handle is formed on each of the end walls. The handle can be formed on an edge of the end face. For example, in the case of a trapezoidal end wall, the handle can be fastened to or integrally molded onto the longer, parallel edge of the trapezoid. In this embodiment, it must be possible to introduce the filter device so deep into the fume extraction device that the handle does not protrude above the suction opening when it is introduced.

According to a preferred embodiment, however, a handle is formed in each case on the side of each of the end walls which faces the rails and thus the other end wall, said handle extending in the longitudinal direction of the rails. A handle which protrudes over the surface of the end wall in this direction is understood here to mean a handle extending in the longitudinal direction of the rails. The handle is hence preferably embodied as a projection. The handle can for example have the shape of a partial circle. If the end wall consists of metal, for example sheet metal, the handle can be introduced by stamping. In the case of a front wall made of plastic, the handle can for example be produced by injection molding during manufacture. Because a handle is fastened to the inside of each of the end walls, the filter device can easily be removed from the fume extraction device and in particular from the suction opening.

According to one embodiment, the holding frame has a first rail in which the edges of the at least two filter elements which lie adjacent to one another are held, and has two second rails in which the opposite, spaced-apart edges of the two filter elements are held. One advantage of this embodiment is that the edges of the filter elements are closed and the filter material is thus held securely. Thus, for example, expanded metal filter layers, wire mesh or wire fabric can be used as filter material and can be securely held in the holding frame without a separate filter frame.

According to a further embodiment, the first rail has a web running in the longitudinal direction, which the edges of the two filter elements, which lie adjacent to one another, abut on opposite sides. Because the filter elements are not supported directly on one another but on the web which is formed in the first rail, the stability of the filter device is increased.

The holding frame can consist of multiple parts. In particular, the rails to the end walls can be present separately. In this embodiment, the parts of the holding frame can for example consist of metal, in particular of sheet metal. The parts can be connected to one another, for example by screws. According to a preferred embodiment, however, the holding frame is formed in one piece. In this embodiment, the holding frame consists, for example, of plastic and can be produced by injection molding. However, in the one-piece embodiment the holding frame can also consist of metal and be produced for example by bending and stamping. The advantage of a one-piece holding frame is the simplified production and the greater stability of the filter device.

To further increase the stability of the filter device, at least one filter element can have a support element which extends in the longitudinal direction of the filter element in its interior. The support element can represent a tube, for example, and preferably extends over the entire length of the support element. At the longitudinal ends of the support element, it can be screwed to the end walls of the filter device. For this purpose, a screw can be guided through the end wall from the outside on each end wall and screwed into the longitudinal end of the tubular support element.

According to a further aspect, the invention relates to a fume extraction device which has a fume extraction housing with a suction opening in the upper face of the fume extraction housing, and a fan which is arranged offset below relative to the suction opening. The fume extraction device is characterized in that the fume extraction device has at least one inventive filter device.

Advantages and features which are described in respect of the inventive filter device also apply—where applicable—for the inventive fume extraction device and vice versa.

A fume extraction device is understood as a device by means of which fumes and vapors, in particular in a kitchen, can be sucked in and cleaned. In particular, the fume extraction device represents a device in which steam and/or vapors sucked into the suction opening of the fume extraction device are directed downward and cleaned there by at least one filter device.

The fume extraction device can be a so-called downdraft fan. A downdraft fan is understood as a fume extraction device in which the suction opening is located horizontally adjacent to the hob or in a recess in the hob. A housing of the fume extraction device is downwardly contiguous to this suction opening, in which the at least one filter device is provided via which the fumes and vapors are cleaned. The interior of the housing is accessible from above via the suction opening. An exhaust air opening is provided on the housing of the fume extraction device, and is connected to the fan of the fume extraction device via further duct elements. The air cleaned by the filter device is discharged from the housing via the exhaust air opening. The exhaust air opening can hence also be referred to as a clean air opening.

In the case of a downdraft fan, the entire interior of the housing, which is contiguous with the suction opening, is available to accommodate a filter device. Moreover, in the case of a downdraft fan, the suction opening is provided at the level of the hob or slightly offset upward and the filter device is offset downward relative to the suction opening. Thus particles that fall out of the filter device and in particular out of the filter elements cannot fall onto the hob, as is the case with a fume extraction hood arranged above the hob. Thus, for example, knitted metal or warp-knitted metal can also be used as filter material for the filter element, although with this filter material metal fibers can partially detach. Furthermore, in the case of a downdraft fan, the holding frame can easily be used to collect contaminants. Finally, in the case of a downdraft fan, the interior of the housing of the fume extraction device is easily accessible, such that the filter device accommodated in the housing can be easily removed and reinserted after cleaning.

In the case of the inventive fume extraction device, this has a fume extraction housing with a suction opening in the upper face of the fume extraction housing. The suction opening preferably has a rectangular cross-section which is slightly larger than the width and length of the fume extraction device.

Directional indicators such as above and below refer to the fume extraction device and the parts thereof in an assembled state, in which the suction opening lies horizontally.

The fan of the fume extraction device is arranged offset downward relative to the suction opening. The fan is in particular fluidically connected to the fan via the fume extraction housing and any duct elements connected thereto. Thus as a result of the negative pressure generated by the fan, air is sucked in downward through the suction opening and flows from above into the fume extraction housing. The fume extraction device has at least one inventive filter device. The filter device is preferably located in the vicinity of the suction opening in the fume extraction housing. As a result, the filter device is easily accessible to the user from above through the suction opening. The filter device is particularly preferably held in the fume extraction housing by a holding geometry which is provided on two walls of the fume extraction housing. The holding geometry can be formed by one or more projections, for example one or more strips of material, which extend inward from the walls into the fume extraction housing.

Particularly preferably, the filter device is introduced into the fume extraction housing such that the edges of the filter elements which lie adjacent to one another face away from the suction opening. The V-shaped filter device is thus introduced into the fume extraction housing such that the tip of the V-shape points downward. Thanks to this arrangement of the filter device, the drawn-in air is sucked into the space which is formed between the filter elements at an angle relative to one another and the end walls which are preferably provided. The rail, in which the edges of the two filter elements lie adjacent to one another, also serves here to collect separated contaminants such as grease. The air drawn in flows completely against the filter area of the two filter elements.

According to a preferred embodiment, the fume extraction housing enlarges downward from the suction opening at least in some areas. A duct section of the fume extraction housing with a constant cross-section can here firstly be contiguous to the suction opening over its height. The first duct section preferably has a rectangular cross-section. An area of the fume extraction housing with an increasing cross-section over the height of the area can then be contiguous to this duct section. After this enlargement area, a further duct section with a constant cross-section over its height can follow. The cross-section of the second duct section located further down is in this case larger than the cross-section of the first duct section adjoining the suction opening. The second duct section also preferably has a rectangular cross-section. This can be closed on the lower face of the second lower duct section, i.e. can have a bottom. An exhaust air opening of the fume extraction housing is preferably introduced on one side of the second duct section, via which air can reach the fan via further ducts. Preferably the exhaust air opening is introduced in the rear side of the fume extraction housing. The rear side is understood as the side facing away from the user of the fume extraction device. In this embodiment, the fume extraction device can for example be arranged between one or both side edges of a hob. Alternatively, the fume extraction device can also be located for example between two separate hobs in the depth direction of the hobs or be introduced into a recess in the hob which extends in the depth direction in the center of the width of the hob.

The filter device is preferably located at least partially in the enlarged area. The filter device is particularly preferably arranged such that the edges of the two filter elements which are spaced apart from one another, i.e. the upper edges, are located in the first upper duct section and there abut the inner faces of two opposite walls of the fume extraction housing. The end walls of the filter device abut the two further walls of the preferably rectangular first duct section. Since the filter elements are at an angle in respect of one another and the lower longitudinal edges of the filter elements abut one another, the distance between the filter element and the wall of the duct section abutting it increases. In addition, the area of the enlargement of the fume extraction housing is at a height at which some of the filter elements of the filter device are also located. In particular, the cross-section of the fume extraction housing enlarges at the walls which the filter elements in the first duct section abut. As a result, the distance between the filter element and the wall of the fume extraction housing also increases, in addition to the increase due to the inclined arrangement of the filter elements, due to the enlargement of the fume extraction housing. This ensures that a uniform flow of air in the fume extraction housing and a reliable flow through the filter elements can be achieved. In particular, an accumulation of air, which could occur due to insufficient distance between the filter element and the wall of the fume extraction housing, cannot occur in the preferred embodiment of the fume extraction housing. Moreover, the development of noise in the fume extraction housing is reduced by the enlargement of the fume extraction housing.

According to a particularly preferred embodiment, the enlargement area between the first and the second duct section and also the transitions from the first duct section to the enlargement area and from the enlargement area to the second duct section are formed by curved surfaces. The transition from the second duct section to the bottom of the fume extraction housing is particularly preferably rounded. As a result, no edges or shoulders arise between the areas of the fume extraction housing. This means the build-up of contaminants is prevented and the fume extraction housing can easily be cleaned.

According to a preferred embodiment, the suction opening has a rectangular, elongated cross-section and a width of 150 mm. With conventional downdraft fans, the width of the suction opening is usually limited to 100 mm. By preferably providing a suction opening with a larger width, in particular 150 mm, according to the invention, on the one hand the filter area of the filter device can be maximized at a given height of the fume extraction housing. The height of the fume extraction housing is limited in particular by further built-in components which are provided below the fume extraction device in a kitchen arrangement, for example drawers of a kitchen cabinet. Moreover, due to the wider suction opening, its cross-section is also larger and thus the development of noise is further minimized.

BRIEF DESCRIPTION OF THE DRAWINGS

The invention is explained again below with reference to the accompanying figures, in which.

DETAILED DESCRIPTION OF EXEMPLARY EMBODIMENTS OF THE PRESENT INVENTION

Figure 1:
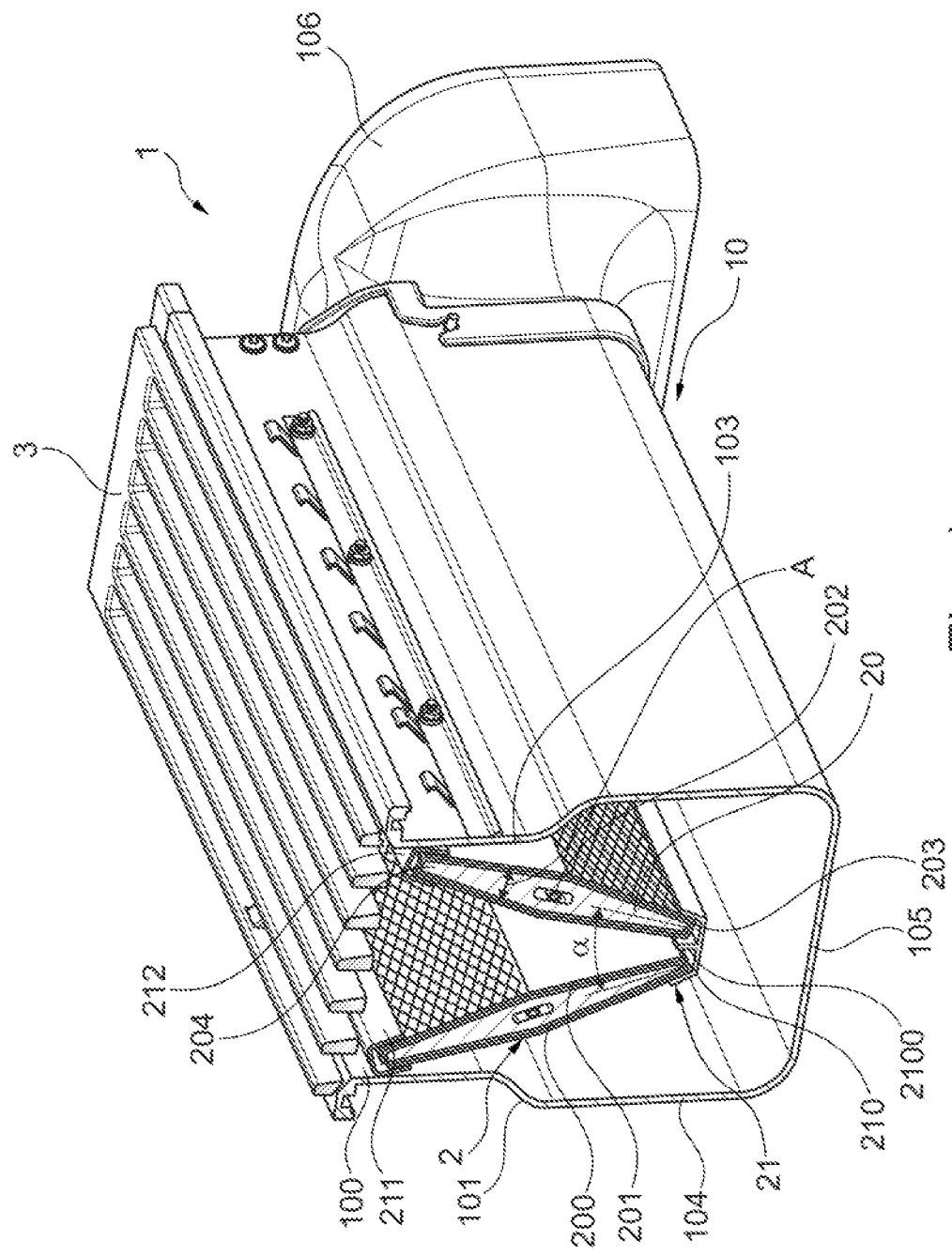
FIG. 1: shows a schematic, perspective sectional view of an embodiment of the inventive fume extraction device with a first embodiment of the inventive filter device.

FIG. 1 shows a schematic, perspective sectional view of an embodiment of the inventive fume extraction device 1 with a first embodiment of the inventive filter device 2. The fume extraction device 1 comprises a fume extraction housing 10 and a filter device 2. In addition, the fume extraction device 1 comprises a fan, which is not shown in FIG. 1, but is preferably offset downward relative to the fume extraction housing 10.

The fume extraction housing 10 has an elongated shape. In the assembled state, the fume extraction housing 10 lies parallel to an edge of a hob (not shown). The fume extraction housing 10 is particularly preferably arranged between two hobs (not shown) and extends in the depth direction of the hobs. Alternatively, the fume extraction housing 10 can also be introduced into a recess made in the depth direction of the hob.

The fume extraction housing 10 has a suction opening 100 in the upper face. The suction opening 100 has a rectangular cross-section. A first duct section 103 is contiguous with the suction opening 100 at the bottom, and has a rectangular cross-section corresponding to the cross-section of the suction opening 100 and whose cross-section is constant over the height of the first duct section 103. At the bottom, an enlargement 101 of the fume extraction housing 10 is contiguous with the first duct section 103. The width of the fume extraction housing 10 increases over the height of said enlargement 101. A second duct section 104 is contiguous with the enlargement 101. The second duct section 104 has a cross-section which is constant over its height and is closed below by a bottom 105. A duct 106 is contiguous with the rear wall of the fume extraction housing 10, air being able to reach the fan of the fume extraction device 1 via said duct 106. The duct 106 is curved and hence directs the air downward.

In the assembled state of the fume extraction device 1, the suction opening 100 lies in the plane of the hob(s) (not shown). In the embodiment shown, the suction opening 100 is covered by a grille 3. It is however also possible to close the suction opening 100, in the state in which the fume extraction device 1 is not in operation, by another cover element, for example a plate or flap.

A filter device 2 is introduced into the fume extraction housing 10.

Figure 2:
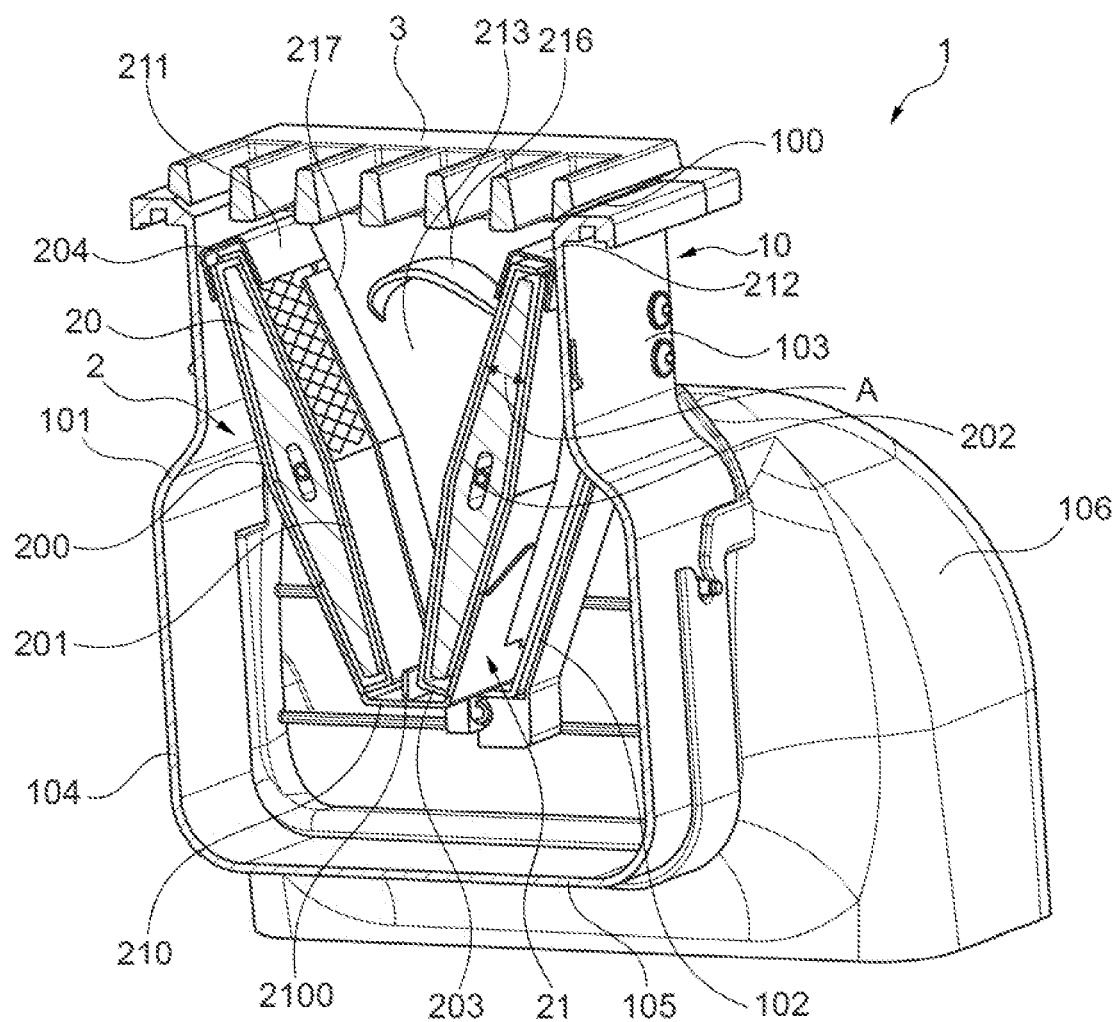
FIG. 2: shows a further schematic, perspective sectional view of the embodiment of the inventive fume extraction device according to FIG. 1.
Figure 3:
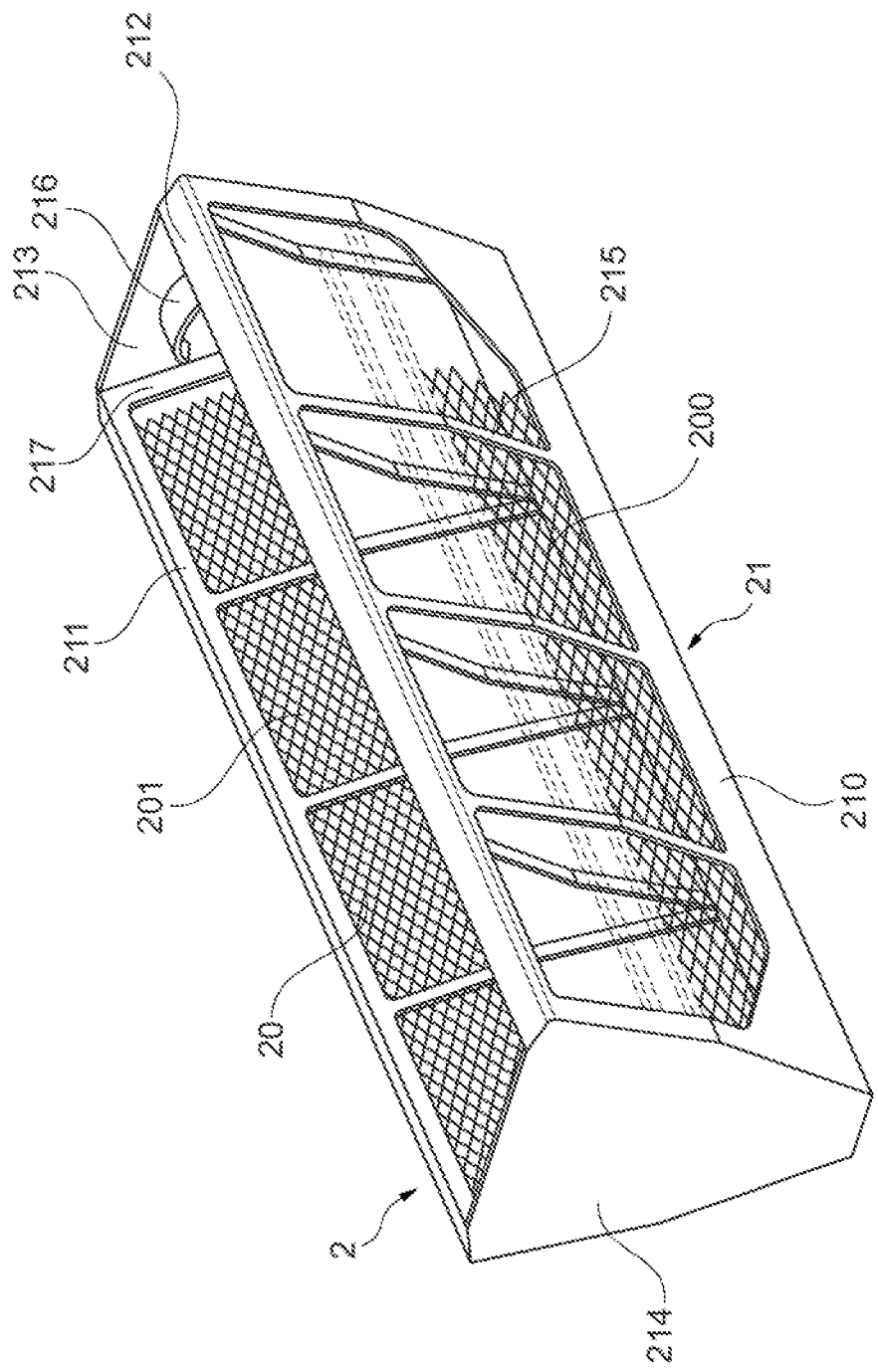
FIG. 3: shows a schematic perspective view of the first embodiment of the filter device according to FIG. 1.

The filter device 2, which is also shown in more detail in FIGS. 2 and 3, consists of two filter elements 20 and a holding frame 21.

The two filter elements 20 are held in the holding frame 21. Each of the filter elements 20 has a variable distance A between the opposite outer faces 200, 201 of the filter element 20 over its surface. In particular, the filter elements 20 in the embodiment shown have a diamond-shaped cross-section. The two filter elements 20 are arranged at an angle relative to one another and an edge 203, which can also be referred to as the lower longitudinal edge, of one of the filter elements 20 lies adjacent to a further edge 203 of the other filter element 20. The two filter elements 20 thus form a V-shape. In the embodiment shown, a support element 202 is provided in each filter element 20, which extends in the center of the filter elements 20 in their longitudinal direction. The support elements 202 can be rods or tubes.

The holding frame 21 consists of a first rail 210 and two second rails 211, 212. In the embodiment shown, the lower longitudinal edges 203 of the two filter elements 20 are held in a first rail 210. The rail 210 moreover has a web 2100 which extends in the longitudinal direction of the rail 210 and lies in the center thereof. The two filter elements 20 thus rest with their lower edges 203 on opposite sides of the web 2100 in the first rail 210. The second rails 211, 212 run on the upper longitudinal edges 204 of the filter elements 20, i.e. the upper edges 204 are each accommodated in one of the second rails 211, 212 of the holding frame 21. At the longitudinal ends, the holding frame has end walls 213, 214, each of which has a trapezoidal shape. The rails 210, 211, 212 rest with their longitudinal ends on the end walls 213, 214 and are preferably fastened thereto or configured therewith in one piece.

As can be seen from FIGS. 2 and 3, a handle 216 is provided on the inner face of the end wall 213, which in the embodiment shown has a partial circular shape. A handle, which is not visible in the figures, is also preferably provided on the inner face of the end wall 214. Moreover, in the embodiment shown, the filter device 2 has support walls 217 which extend inward from the end walls 213, 214 and at the end-face ends of the filter elements 20 over the width of the filter elements 20 abut the outer faces 200, 201 of the filter elements 20. The support walls thus run perpendicular to the rails 210, 211, 212.

Moreover, the holding frame 21 has struts 215 running between the second rails 211, 212 and the first rail 210. These extend perpendicular to the rails 211, 212, 210 and have a small width. The struts 215 serve to additionally hold the filter elements 20 and in particular the filter material.

The filter device 2 is introduced into the fume extraction housing 10 such that the tip of the V-shape is directed downward. In particular, the second rails 211, 212 of the holding frame 21 lie in the vicinity of the suction opening 100 in the first duct section 103 of the fume extraction housing 10. The first rail 210 is offset downward relative to the second rails 211, 212. In the embodiment shown, the first rail 210 and thus the lower face of the filter device 2 lies in the region of the second duct section 104 of the fume extraction housing 10.

As can be seen from FIG. 2, in the embodiment shown a holding geometry 102 is formed on the end walls of the fume extraction housing 10, which extends inward from the end wall of the fume extraction housing 10 and supports the filter device 2 at its longitudinal ends from below. In particular, the holding geometry 102 therefore represents a V-shaped strip of material.

Figure 4:
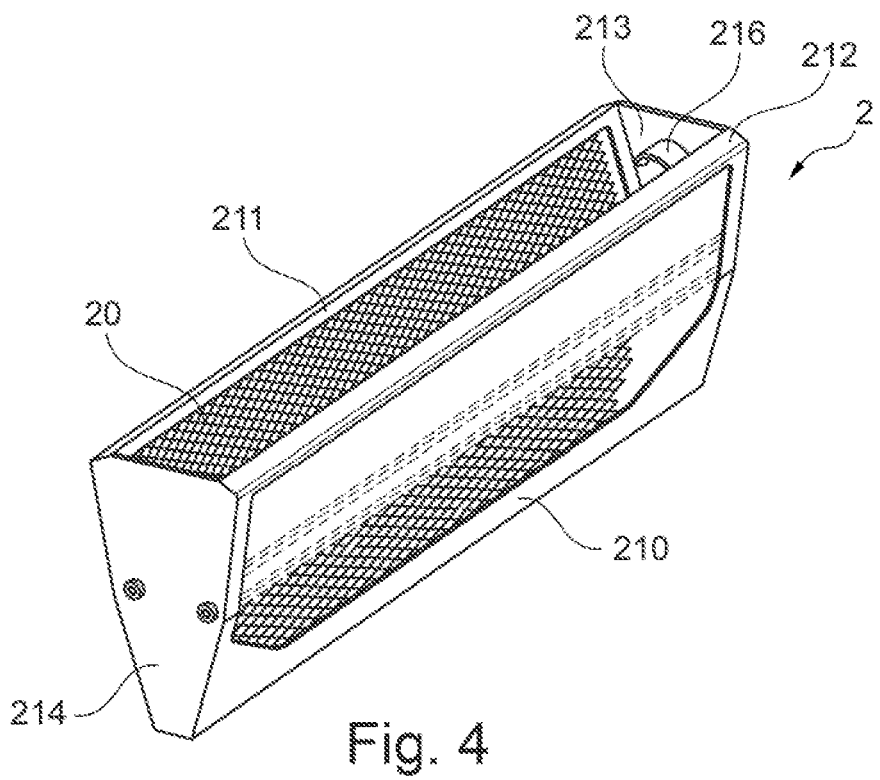
FIG. 4: shows a schematic perspective view of a second embodiment of the inventive filter device.
Figure 5:
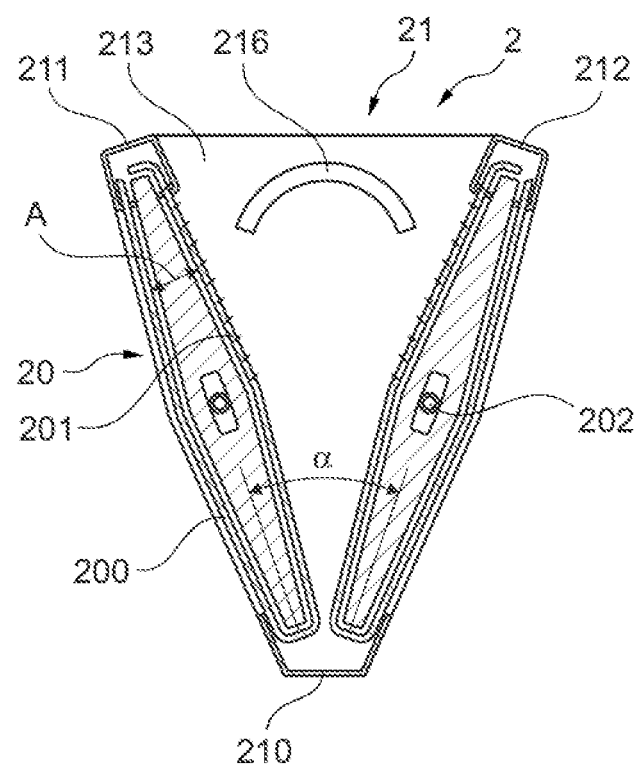
FIG. 5: shows a schematic sectional view of the second embodiment of the filter device according to FIG. 4.

FIGS. 4 and 5 show a second embodiment of the inventive filter device 2. This embodiment differs from the embodiment shown in FIGS. 1 to 3 only in that the rails 210, 211 and 212 to the end walls 213, 214 represent separate components. In this embodiment, the rails 210, 211, 212 are configured such that inwardly directed folded edges are provided on their open side which engage in the filter material of the filter elements 20 and are thus fastened to the filter material. Moreover, in contrast to the first embodiment, no web is provided in the case of the first rail 210. The folded edges of the lower rail 210, which are provided on the upper edges thereof, each engage onto an outer face 200, which forms the clean air side of the filter elements 20. In the second embodiment of the filter device 2, the end walls 213, 214 are connected to the filter elements 20 by screws (see FIG. 4). The screw protrudes through the end wall 213 or 214 and engages in the longitudinal end of the support element 202 of the filter element 20, which represents a tube. As a result, the filter device 2 forms a structural unit and can be introduced and removed as a whole into the fume extraction housing 10 of a fume extraction device 1.

The present invention has a number of advantages. In particular, by combining a V-shaped arrangement of filter elements and the three-dimensional configuration of the filter elements, in particular a diamond shape, the filter area through which fumes and vapors can be filtered can be maximized.

The invention claimed is:

1. A filter device for a fume extraction device, said filter device comprising:
   at least two filter elements arranged at an angle relative to one another, with an edge of one of the at least two filter elements lying adjacent to an edge of the other one of the at least two filter elements, each of the at least two filter elements having a surface with a variable distance between opposite outer faces of the filter element; and
   a holding frame for holding the at least two filter elements,
   wherein the distance between the opposite outer faces of each of the at least two filter elements from one edge of the filter element in a direction of an opposite edge increases from a minimum to a maximum and from the maximum to the opposite edge decreases to the minimum, and
   wherein the filter element has a diamond-shaped cross-section.

2. The filter device of claim 1, wherein the adjacent edges of the at least two filter elements abut one another.

3. The filter device of claim 1, wherein the at least two filter elements are at an angle of less than 90°.

4. The filter device of claim 1, wherein the holding frame includes two end walls which abut end faces of the at least two filter elements, and rails running between the end walls.

5. The filter device of claim 4, wherein each of the end walls has a side which faces the rails, said holding frame including a handle formed on the side and extending in a longitudinal direction of the rails.

6. The filter device of claim 4, wherein a first one of the rails is configured to hold the adjacent edges of the at least two filter elements, and wherein a second one of the rails is configured to hold one of the spaced-apart edges of the at least two filter elements.

7. The filter device of claim 6, wherein the first one of the rails includes a web running in a longitudinal direction, said adjacent edges of the at least two filter elements abutting opposite sides of the web.

8. The filter device of claim 1, wherein the holding frame is formed in one piece.

9. The filter device of claim 1, wherein at least one of the at least two filter elements includes a support element which extends in a longitudinal direction of the filter element in its interior.

10. A fume extraction device, comprising:
    a fume extraction housing having an upper face with a suction opening;
    a fan arranged offset downward relative to the suction opening; and
    a filter device comprising at least two filter elements arranged at an angle relative to one another, with an edge of one of the at least two filter elements lying adjacent to an edge of the other one of the at least two filter element, each of the at least two filter elements having a surface with a variable distance between opposite outer faces of the filter element, and a holding frame for holding the at least two filter elements,
    wherein the distance between the opposite outer faces of each of the at least two filter elements from one edge of the filter element in a direction of an opposite edge increases from a minimum to a maximum and from the maximum to the opposite edge decreases to the minimum, and
    wherein the filter element has a diamond-shaped cross-section.

11. The fume extraction device of claim 10, wherein the adjacent edges of the at least two filter elements abut one another.

12. The fume extraction device of claim 10, wherein the at least two filter elements are at an angle of less than 90°.

13. The fume extraction device of claim 10, wherein the holding frame includes two end walls which abut end faces of the at least two filter elements, and rails running between the end walls.

14. The fume extraction device of claim 13, wherein each of the end walls has a side which faces the rails, said holding frame including a handle formed on the side and extending in a longitudinal direction of the rails.

15. The fume extraction device of claim 13, wherein a first one of the rails is configured to hold the adjacent edges of the at least two filter elements, and wherein a second one of the rails is configured to hold one of the spaced-apart edges of the at least two filter elements.

16. The fume extraction device of claim 15, wherein the first one of the rails includes a web running in a longitudinal direction, said adjacent edges of the at least two filter elements abutting opposite sides of the web.

17. The fume extraction device of claim 10, wherein the holding frame is formed in one piece.

18. The fume extraction device of claim 10, wherein at least one of the at least two filter elements includes a support element which extends in a longitudinal direction of the filter element in its interior.

19. The fume extraction device of claim 10, wherein the filter device is arranged in the fume extraction housing such that the adjacent edges of the at least two filter elements face away from the suction opening.

20. The fume extraction device of claim 10, wherein the fume extraction housing has at least one area configured to enlarge downward from the suction opening, said filter device having at least one area located in the enlarged area.

21. A fume extraction device, comprising:
    a fume extraction housing having an upper face with a suction opening;
    a fan arranged offset downward relative to the suction opening; and
    a filter device comprising at least two filter elements arranged at an angle relative to one another, with an edge of one of the at least two filter elements lying adjacent to an edge of the other one of the at least two filter element, each of the at least two filter elements having a surface with a variable distance between opposite outer faces of the filter element, and a holding frame for holding the at least two filter elements,
    wherein the suction opening has a rectangular, elongated cross-section and preferably has a width of 150 mm.

22. The filter device of claim 3, wherein the at least two filter elements are at an angle of less than 40° relative to one another.

23. The fume extraction device of claim 12, wherein the at least two filter elements are at an angle of less than 40° relative to one another.

\* \* \* \* \*